United States Patent
Hirata et al.

(10) Patent No.: US 6,249,509 B1
(45) Date of Patent: Jun. 19, 2001

(54) OPTICAL DEVICE WITH PROTECTIVE COVER

(75) Inventors: Hideki Hirata; Hajime Utsunomiya; Isamu Kuribayashi; Hiroshi Tanabe, all of Nagano (JP)

(73) Assignee: TDK Corporation, Tokyo (JP)

( * ) Notice: Subject to any disclaimer, the term of this patent is extended or adjusted under 35 U.S.C. 154(b) by 608 days.

(21) Appl. No.: 08/533,740

(22) Filed: Sep. 26, 1995

(30) Foreign Application Priority Data

Sep. 29, 1994 (JP) .................................................. 6-259174

(51) Int. Cl.⁷ ....................................................... G11B 7/24
(52) U.S. Cl. ........................ 369/275.5; 369/286; 369/288; 428/64.4
(58) Field of Search ................................. 369/286, 288, 369/283, 280, 275.5, 275.1, 275.4, 13, 275.2; 428/64.4, 64.7, 65.2, 644 TP, 644 TC, 644 TE, 644 TF; 346/137, 135.1

(56) References Cited

U.S. PATENT DOCUMENTS

| | | | |
|---|---|---|---|
| 4,340,959 | * 7/1982 | Levin | 369/275.5 |
| 4,360,820 | * 11/1982 | Forster et al. | 346/135.1 |
| 4,553,232 | * 11/1985 | Covington et al. | 369/287 |
| 4,561,086 | * 12/1985 | Geyer | 369/275.5 |
| 4,622,661 | * 11/1986 | Hoogeveen et al. | 369/280 |
| 4,686,543 | * 8/1987 | Tani et al. | 346/137 |
| 4,731,620 | * 3/1988 | Yabe et al. | 346/137 |
| 4,920,359 | * 4/1990 | Arai et al. | 346/137 |
| 5,036,510 | * 7/1991 | Hayashi et al. | 369/283 |
| 5,090,008 | * 2/1992 | Clark et al. | 369/284 |
| 5,128,922 | * 7/1992 | Invi et al. | 369/280 |
| 5,293,373 | * 3/1994 | Toide et al. | 369/275.5 |
| 5,305,304 | * 4/1994 | Hayashi | 369/275.5 |
| 5,450,380 | * 9/1995 | Toide et al. | 369/275.5 |
| 5,486,396 | * 1/1996 | Mizukuki et al. | 428/64.2 |

FOREIGN PATENT DOCUMENTS 57-38340   3/1982   (JP) .
6-203409  12/1992   (JP) .

* cited by examiner

*Primary Examiner*—Ali Neyzari
(74) *Attorney, Agent, or Firm*—Larson & Taylor; R. J. Lasker

(57) ABSTRACT

The invention provides an optical disc comprising a circular glass substrate (2) having information-carrying means (3) on one major surface. A protective member (4) of a resin includes a circular flat portion (42) and an annular rim (41) extending perpendicular from the periphery of the flat portion (42). The glass substrate (2) is integrally joined to the protective member (4) such that the information-carrying means (3) of the glass substrate (2) may face the covering portion (42) of the protective member (4). The outer side of the glass substrate (2) is surrounded by the protective member rim (41) to leave a shock absorbing space therebetween. The invention prevents the glass substrate from failure at its corner when impact is applied to the disc.

7 Claims, 6 Drawing Sheets

OPTICAL DEVICE WITH PROTECTIVE COVER

BACKGROUND OF THE INVENTION

1. Technical Field

This invention relates to an optical disc. The optical disc includes optical recording discs such as, for example, magneto-optical discs, phase change type optical recording discs, and write-once optical recording discs as well as read-only optical discs.

2. Background Art

In general, optical discs have information-carrying means in the form of a recording layer or a row of pits on one surface of a substrate. For writing and reading purposes, a light beam, typically a laser beam is directed to the information-carrying means from the rear surface of the substrate. The substrate is generally made of a transparent material for this reason. In the prior art, resin substrates are generally used in order to reduce the disc weight and facilitate formation of grooves and pits for tracking and other purposes.

Over the recent past, active research has been made on optical discs that carry moving picture digital information. To this end, it is essential to increase the capacity and data transfer rate of optical discs and hence, the diameter and revolution of optical discs.

However, resin substrates are difficult to manufacture to uniform quality. Especially when the resin substrates have a large diameter, they tend to be non-uniform, allowing birefringence and other factors to adversely affect writing and reading performance. Additionally, the resin substrates are less resistant to heat and moisture and undergo deformation and deterioration in a hot humid atmosphere. Also since resin substrates with a large diameter are less stiff, high-speed revolution at 1,800 rpm or higher, especially 3,000 rpm or higher causes axial runouts, resulting in a significant increase of focusing and tracking errors.

Under these circumstances, attention is paid to glass substrates having high mechanical strength. The glass substrates, however, are likely to fail, especially near their corner, upon receipt of impact as by accidental dropping or hitting. Although substrates of chemically strengthened glass having higher mechanical strength are known, they can be crushed into scattering chips. Some optical discs are received in cartridges, but still can be broken as a result of vibration of the disc within the cartridge.

Japanese Patent Application Kokai (JP-A) No. 203409/1994 discloses a disc-shaped recording medium comprising a disc-shaped glass substrate and a disc-shaped resin substrate joined thereto wherein the resin substrate has a larger diameter than the glass substrate. The periphery of this recording medium has a cross section as shown in FIG. 5. A resin substrate 4 having a larger diameter is joined to a glass substrate 2 with an adhesive layer 5 while a recording layer 3 on the glass substrate 2 is disposed inside. However, this structure cannot fully prevents a failure of the corner of the glass substrate when impact is applied thereto from an oblique direction.

Japanese Utility Model Application Kokai No. 38340/1982 discloses an optical information recording disc having a glass substrate received in a plastic holder frame. This optical information recording disc is shown in FIG. 6 as comprising a glass substrate 2, a metallization 31 coated on the glass substrate 2 and selectively etched by laser processing in accordance with external signals for recording information, a plastic holder frame 7 having a concave for receiving the metallized glass substrate 2, and a protective plate 10 removably fitted in the plastic holder frame 7 above the concave for covering the glass substrate 2. The protective plate 10 is rigidly secured to the frame 7 by a stop ring 8. This optical information recording disc requires to remove the protective plate 10 upon writing and attach the protective plate 10 again upon reading. This structure intends to prevent direct contact of the recording surface with the ambient atmosphere and reduce the weight, but not to prevent a failure of the glass substrate near its corner. In fact, this optical information recording disc is less effective for preventing a failure of the glass substrate 2 near its periphery since the periphery of the glass substrate 2 is in close fit with the plastic holder frame 7.

SUMMARY OF THE INVENTION

Therefore, an object of the present invention is to provide an optical disc having a glass substrate which is designed to prevent a failure of the glass substrate near its corner upon receipt of physical shocks.

In a first aspect, the present invention provides an optical disc comprising a disc-shaped glass substrate and a protective resin member. The substrate defines a pair of major surfaces and an outer side and has information carrying means on one major surface. The protective member includes a disc-shaped covering portion and an annular rim extending from the periphery of the covering portion. The glass substrate is integrally joined to the protective member. The information-carrying means of the glass substrate faces the covering portion of the protective member. The outer side of the glass substrate is surrounded by the protective member rim to leave a space between the outer side of the glass substrate and the inner surface of the protective member rim. Preferably, another space is left between the one major surface of the glass substrate near the periphery thereof and the covering portion of the protective member.

In a second aspect, the present invention provides an optical disc comprising a pair of disc-shaped glass substrates each defining a pair of major surfaces and an outer side and having information-carrying means on one major surface. A protective resin member includes a disc-shaped partition portion and an annular rim extending from the periphery of the partition portion in opposite directions. The pair of glass substrates are integrally joined to the protective member such that the partition portion of the protective member intervenes between the glass substrates with each information-carrying means disposed inside. The outer side of each the glass substrate is surrounded by the protective member rim to leave a space between the outer side of the glass substrate and the inner surface of the protective member rim.

In preferred embodiments according to the first and second aspects of the invention, the distance from the covering portion to the free end of the protective member rim is greater than the distance from the covering portion of the protective member to the other major surface of the glass substrate; the protective member further includes an annular lug extending inwardly from the free end of the annular rim, the lug covering the other major surface of the glass substrate near the periphery thereof; an adhesive sheet is used to integrally join the glass substrate to the protective member; and the space between the outer side of the glass substrate and the inner surface of the protective member rim is filled with a resin.

In the optical disc of the present invention, the protective resinous member has a peripheral annular rim which radially surrounds the outer side of the glass substrate along its circumference with a shock absorbing space left therebetween. This structure is effective for preventing a failure of the glass substrate near its outer corner by external shocks from any direction.

BRIEF DESCRIPTION OF THE DRAWINGS

These and further features of the present invention will be apparent with reference to the following description and drawings, wherein.

BEST MODE FOR CARRYING OUT THE INVENTION

Figure 1:
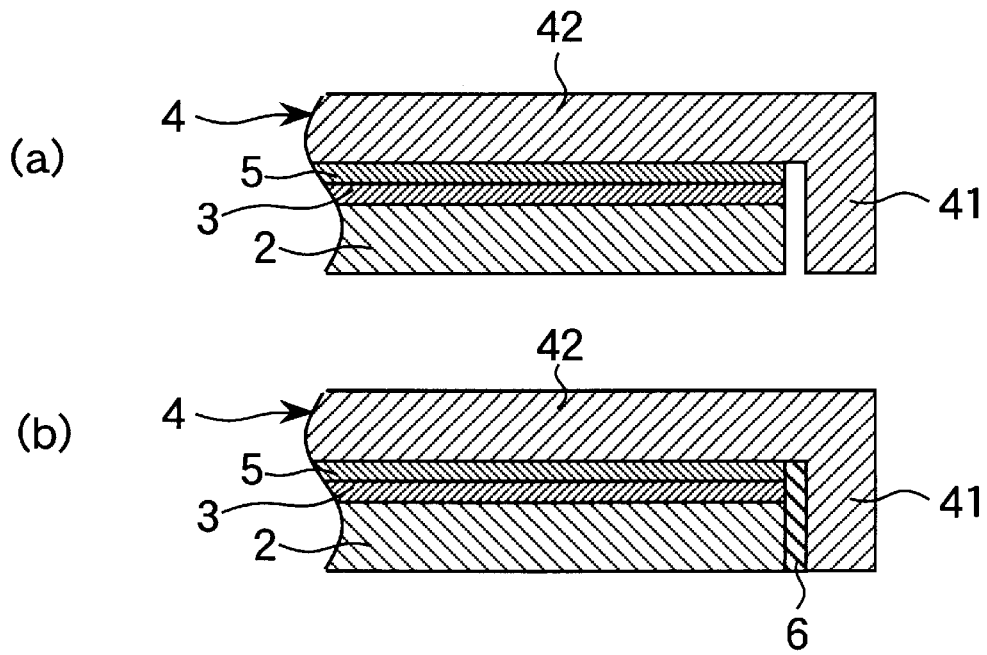
FIGS. 1(a) and 1(b) are cross-sectional views of a corner portion of an optical disc according to a first embodiment of the invention.

Referring to FIGS. 1 to 4, there are illustrated different examples of the optical disc according to a first embodiment of the invention. The first embodiment is directed to an optical disk of the single side writing or reading type having a single glass substrate. The optical disc includes a disc-shaped glass substrate 2 which defines a pair of major surfaces and a radially outer or peripheral side and has information-carrying means 3 on one major surface. The disc further includes a protective member 4 of a resin which includes a disc-shaped covering portion 42 and an annular rim or wall 41 extending from the periphery or outer edge of the covering portion perpendicularly thereto. The covering portion 42 is contiguous to the rim 41. The glass substrate 2 is integrally joined to the protective member 4 with an adhesive layer 5 such that the information carrying means 3 faces the protective member covering portion 42 and the other major surface of the glass substrate 2 (that is, the rear surface which is remote from the information-carrying means 3) is exposed outside. The radially outer or peripheral side of the glass substrate 2 is surrounded by the protective member rim 41 so that the outer side of the glass substrate 2 is not exposed outside. A space is left between the outer side of the glass substrate 2 and the inner surface of the protective member rim 41 as shown in FIGS. 1(a), 2(a), 3(a), and 4.

Preferably the radial spacing (depicted at a in FIG. 4) between the outer side of the glass substrate 2 and the inner surface of the protective member rim 41 is about 0.1 to 1 mm. Outside this range, a narrower space would be insufficient for shock absorption whereas the protective member rim spaced a greater distance would not be strong enough.

If desired, the space between the outer side of the glass substrate 2 and the inner surface of the protective member rim 41 is filled with a resin sealant 6 as shown in FIGS. 1(b), 2(b), and 3(b). The resin sealant 6 is effective for preventing the shocks applied to the rim 41 from being directly transmitted to the glass substrate 2. The type of the resin sealant is not critical and any of epoxy resins, urethane resins, acrylic resins and rubber adhesives may be used. Resins having rubbery elasticity are preferred. It is understood that the space generally offers a higher shock absorbing effect when it is not filled with the resin sealant 6.

Figure 2:
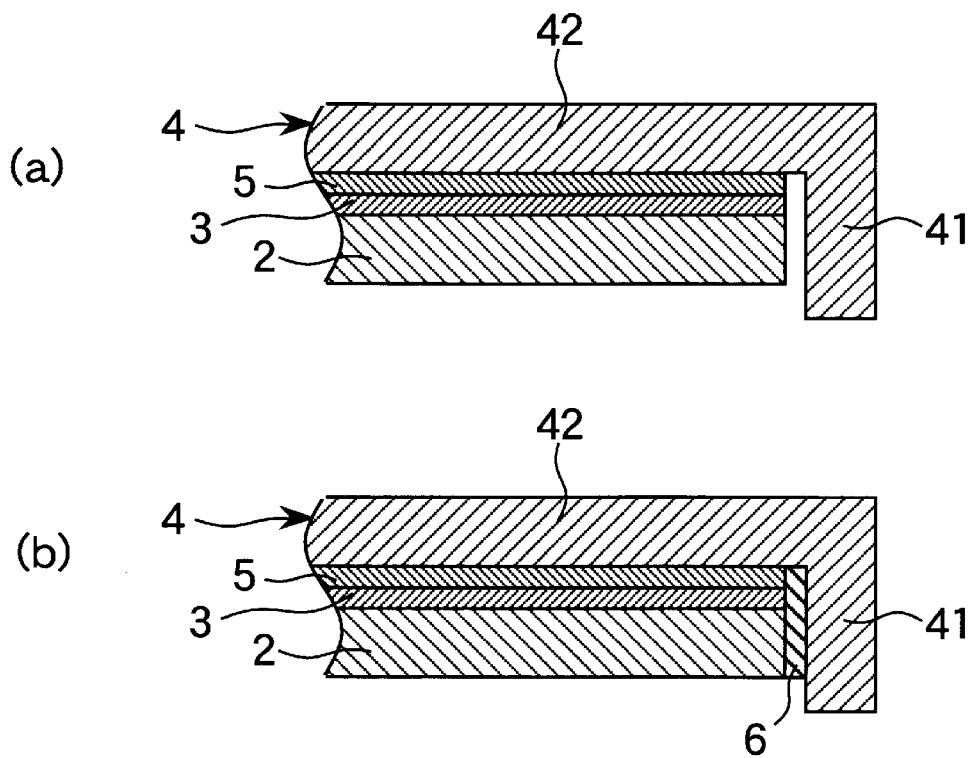
FIGS. 2(a) 2(b) are cross-sectional views of a corner portion of another exemplary optical disc according to the first embodiment of the invention.

In the exemplary optical disc shown in FIG. 1, the free end (lower end in FIG. 1) of the rim 41 is flush with the rear surface of the glass substrate 2. In the other exemplary disc of FIG. 2, the protective member rim 41 extends beyond the glass substrate 2. That is, the distance from the covering portion 42 to the free end of the rim 41 of the protective member 4 is greater than the distance from the covering portion 42 of the protective member 4 to the rear surface of the glass substrate 2. Except for this protrusion, the disc of FIG, 2 has the same structure as the disc of FIG. 1. By extending the protective member rim 41 beyond the rear surface of the glass substrate 2 as shown in FIG. 2, the structure becomes more effective for protecting the glass substrate corner from a failure.

Figure 3:
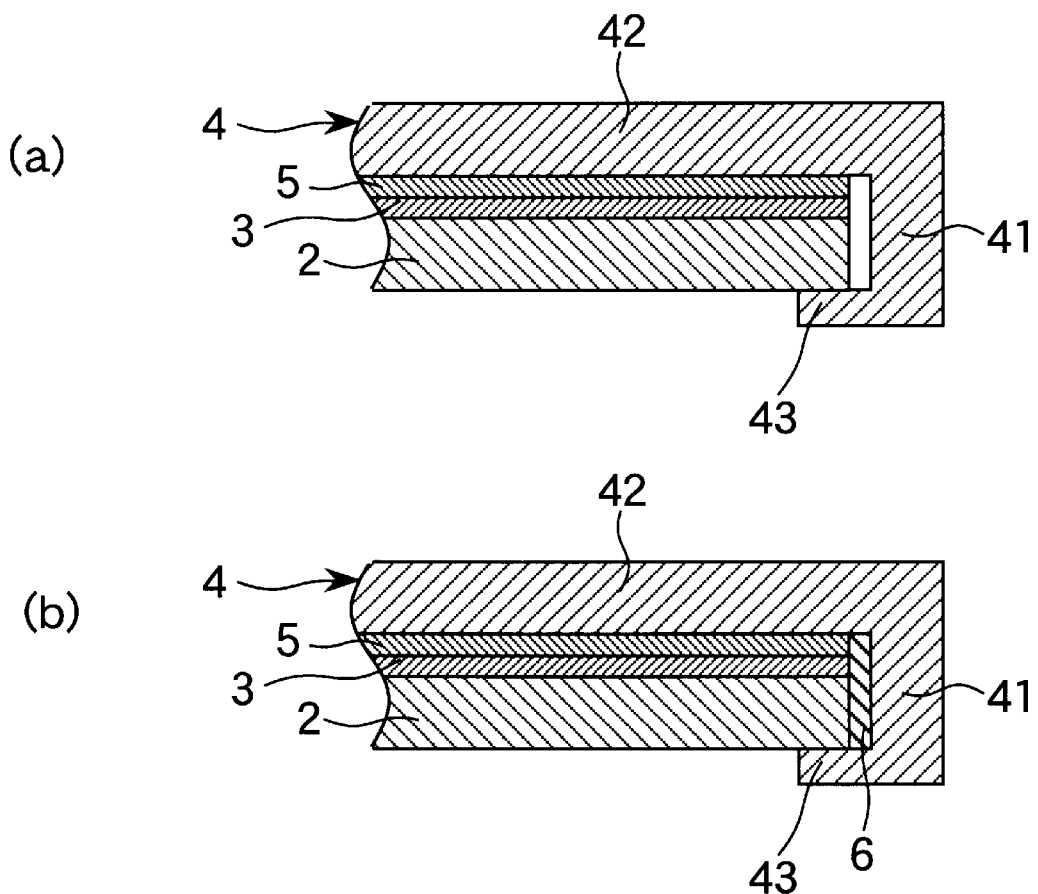
FIGS. 3(a) and 3(b) are cross-sectional views of a corner portion of a further exemplary optical disc according to the first embodiment of the invention.

In the optical disc of FIG. 3, the protective member 4 further includes an annular lug 43 extending inwardly from the free end of the annular rim 41. The lug 43 is parallel to the covering portion 42. The lug 43 covers the rear surface of the glass substrate 2 near the periphery thereof. Except for this lug, the disc of FIG. 3 has the same structure as the disc of FIG. 1. By adding the lug 43 as shown in FIG. 3, the structure becomes more effective for protecting the glass substrate corner from a failure.

Figure 4:
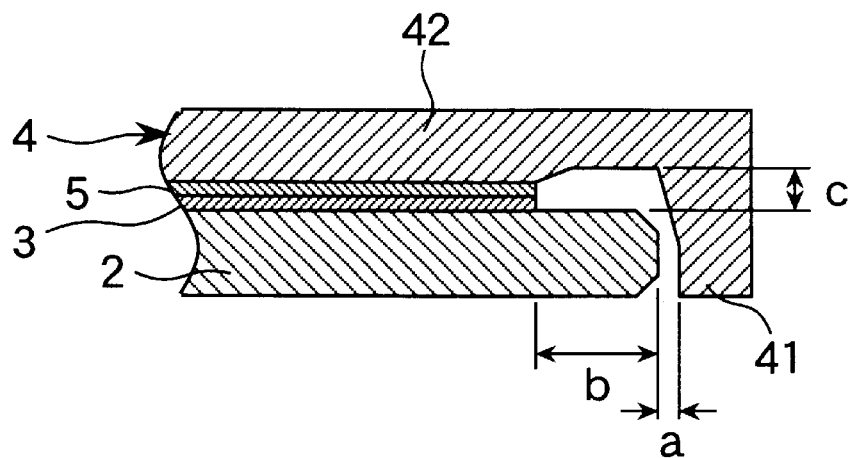
FIG. 4 is a cross-sectional view of a corner portion of a still further exemplary optical disc according to the first embodiment of the invention.

In the optical disc of FIG. 4, another space is left between the one surface (upper surface in FIG. 4) of the glass substrate 2 near the periphery thereof and the covering portion 42 of the protective member 4. Except for this additional space, the disc of FIG. 4 has the same structure as the disc of FIG. 1. Preferably the additional space radially extends a distance (depicted at b in FIG. 4) of about 0.2 to 4.0 mm from the outer edge of the glass substrate 2. The additional space further improves the shock absorbing effect near the periphery of the glass substrate 2. The distance (depicted at Q in FIG. 4) between the glass substrate 2 and the covering portion 42 is preferably about 0.1 to 0.4 mm. Outside this range, a narrower space would be insufficient for additional shock absorption whereas the protective member covering portion spaced a greater spacing would not be strong enough in this region.

Figure 7:
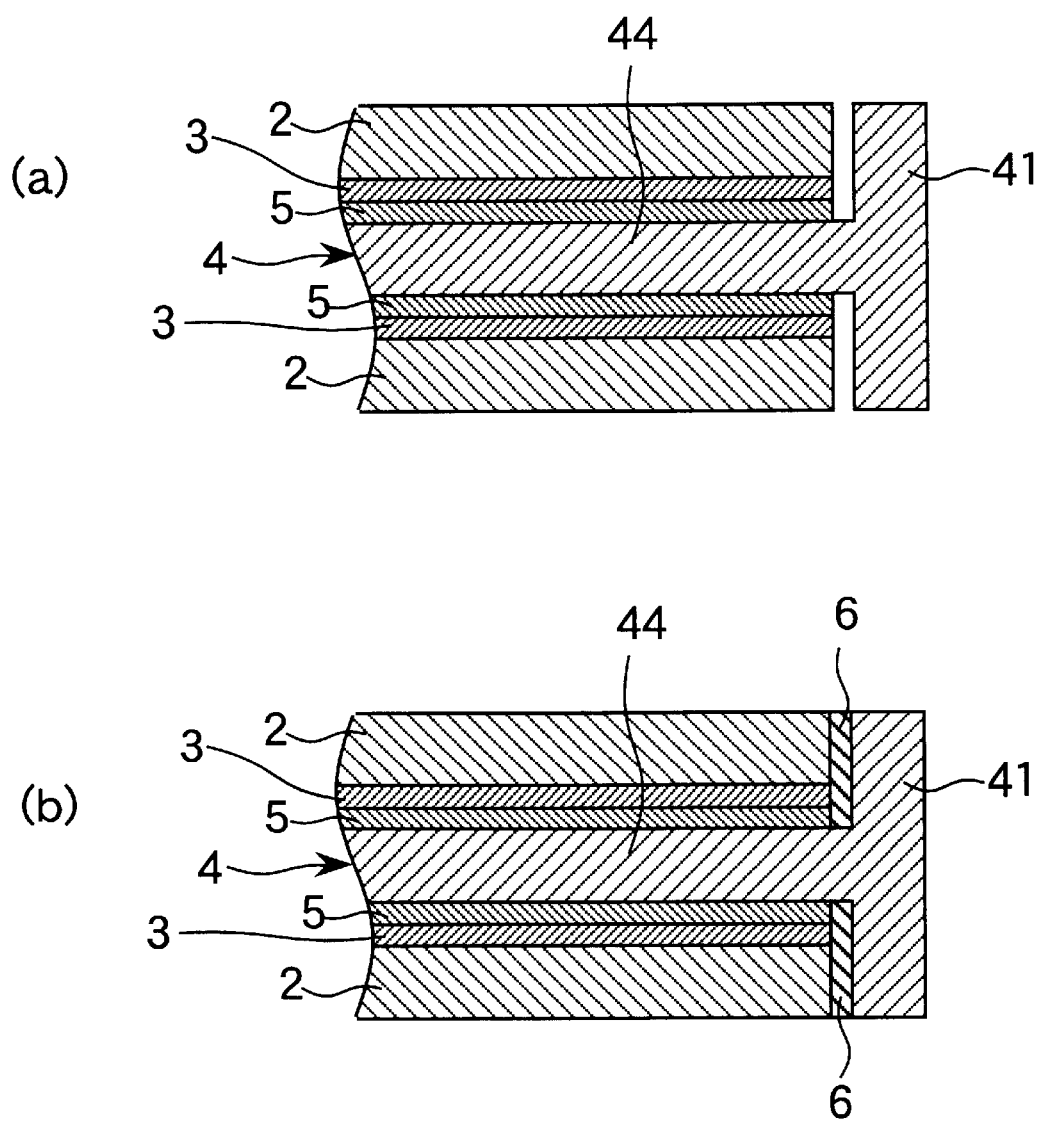
FIGS. 7(a) and 7(b) are cross-sectional views of a corner portion of an optical disc according to a second embodiment of the invention.
Figure 8:
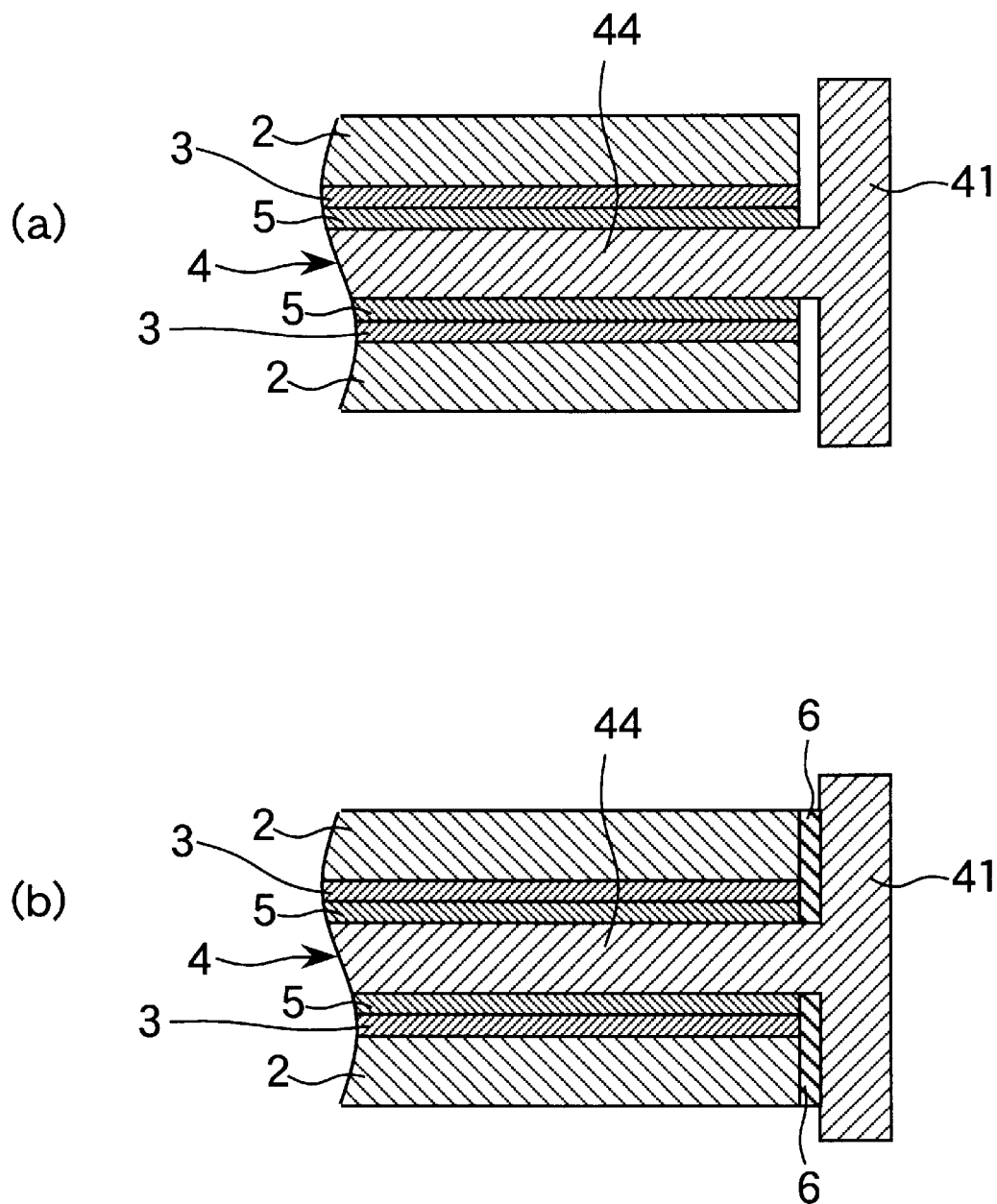
FIGS. 8(a) and 8(b) are cross-sectional views of a corner portion of another exemplary optical disc according to the second embodiment of the invention.
Figure 9:
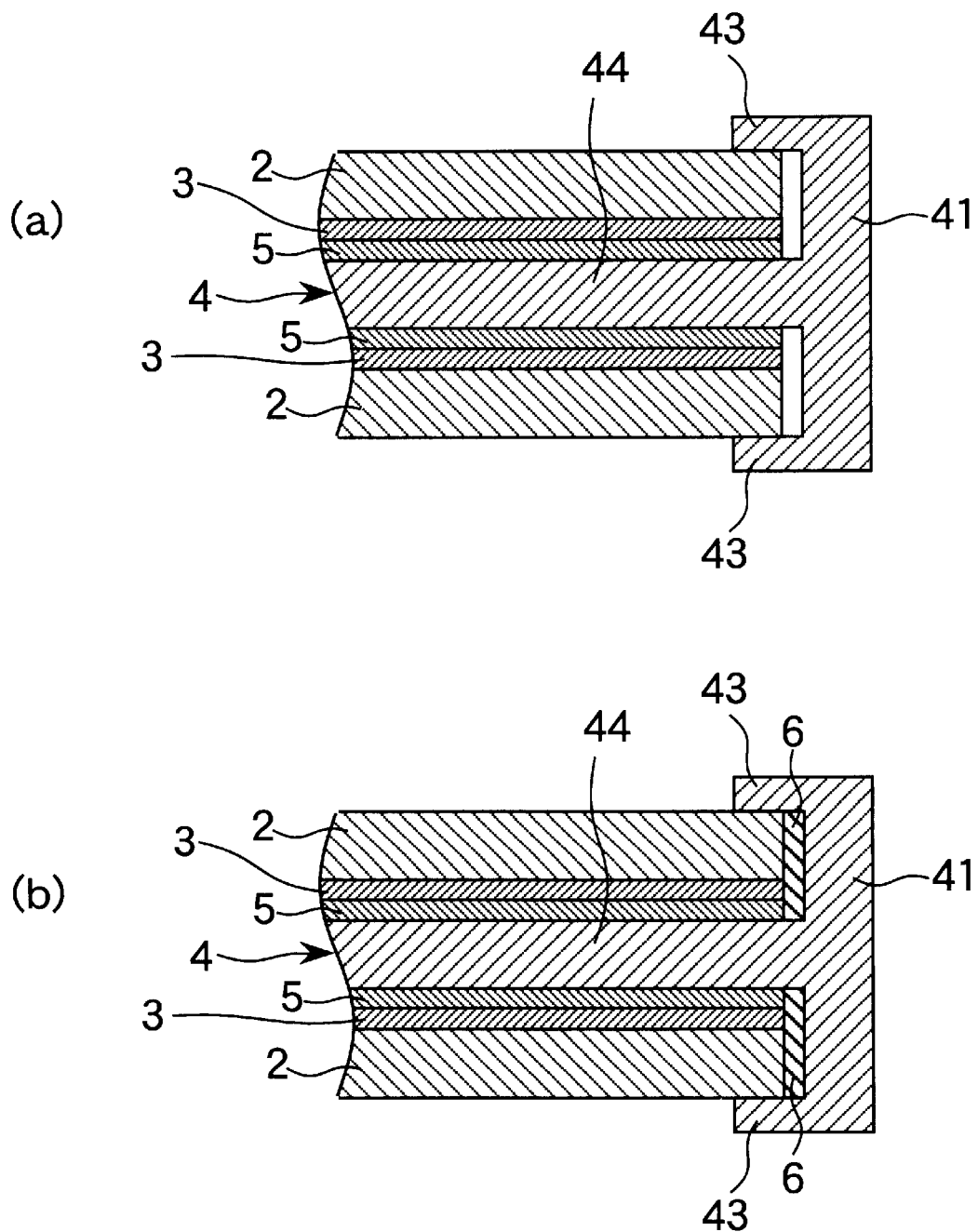
FIGS. 9(a) and 9(b) are cross-sectional views of a corner portion of a further exemplary optical disc according to the second embodiment of the invention.

Referring to FIGS. 7 to 9, there are illustrated different examples of the optical disc according to a second embodiment of the invention. The second embodiment is directed to an optical disc of the double side writing or reading type having a pair of glass substrates. The optical disc includes a pair of disc-shaped glass substrates 2, 2 which each defines a pair of major surfaces and an outer side and has information-carrying means 3 on one major surface. The disc further includes a protective member 4 of a resin which includes a disc-shaped partition portion 44 and an annular rim or wall 41 extending from the periphery or outer edge of the partition portion perpendicularly thereto in opposite directions. The partition 44 is contiguous to the rim 41 at its center. The glass substrates 2, 2 are integrally joined to the protective member 4 with adhesive layers 5, 5 such that the protective member partition 44 intervenes between the glass substrates 2, 2 with each information-carrying means 3 disposed inside. Differently stated, the glass substrates 2, 2 are opposed to each other via the partition 44 so as to confine the information carrying means 3, 3 inside. The other major surface of each glass substrate 2 (that is, the rear surface which is remote from the information-carrying means 3) is exposed outside. The radially outer or peripheral side of each glass substrate 2 is surrounded by the protective member rim 41 so that the outer side of the glass substrate 2 is not exposed outside. A space is left between the outer side of each glass substrate 2 and the inner surface of the protective member rim 41 as shown in FIGS. 7(*a*), 8(*a*), and 9(*a*).

If desired, the spaces between the outer side of the glass substrates 2 and the inner surface of the protective ember rim 41 are filled with resin sealants 6 as shown in FIGS. 7(*b*), 8(*b*), and 9(*b*). As previously mentioned, the space generally offers a higher shock absorbing effect when it is empty.

In the exemplary optical disc shown in FIG. 7, each of the upper and lower ends of the rim 41 is flush with the rear surface of the glass substrate 2. In the other exemplary disc of FIG. 8, the protective member rim 41 extends beyond each glass substrate 2. That is, the distance from the partition 44 to the free end of the protective member rim 41 is greater than the distance from the partition 44 of the protective member 4 to the rear surface of each glass substrate 2. Except for this protrusion, the disc of FIG. 8 has the same structure as the disc of FIG. 7. By extending the protective member rim 41 beyond the rear surface of each glass substrate 2 as shown in FIG. 8, the structure becomes more effective for protecting the glass substrate corner from a failure.

In the optical disc of FIG. 9, the protective member 4 further includes an annular lug 43 extending inwardly from each free end of the annular rim 41. The lug 43 is parallel to the partition 44. The lug 43 covers the rear surface of each glass substrate 2 near the periphery thereof. Except for these lugs, the disc of FIG. 9 has the same structure as the disc of FIG. 7. By adding the lugs 43 as shown in FIG. 9, the structure becomes more effective for protecting the glass substrate corner from a failure.

The respective components are described below.

Glass Substrate 2

The glass substrate 2 is transparent to writing and reading light. The glass substrate is rigid enough to prevent axial runouts during driving. It is also fully resistant to heat and moisture and causes little birefringence.

The size of the glass substrate 2 may be suitably determined for a particular purpose. That is, the gage and diameter of the glass substrate may be properly determined in accordance with the structure and size of the protective member so that the disc may ensure fully reliable writing and reading operation and the overall gage of the disc may meet the selected standard. Usually, the glass substrate has a diameter of about 50 mm to about 360 mm and a gage of about 0.5 mm to about 2 mm.

Information-Carrying Means 3

The information-carrying means includes a recording layer when the disc is an optical recording disc and a read-only pattern in the form of a row of pits carrying information when the disc is a read-only optical disc. The optical recording disc also has a read-only pattern in the form of a groove or pits for tracking and addressing purposes. Since the present invention uses a glass substrate, the read-only pattern is generally borne by a resin layer formed on the surface of the glass substrate. The resin layer bearing the pattern is usually formed by a photo-polymerization (2P) method or photolithography. The recording layer may be any of the magneto-optical, phase change and write-once types.

Protective Member 4

The protective member is formed of a resin. The resin used herein is not critical and typically selected from polycarbonates, ABS resins, acrylic resins, and polyolefins, for example. The protective member may be either transparent or opaque by adding a pigment or the like to the resin if desired.

The thickness of the protective member may be suitably determined so as to achieve a sufficient shock absorbing effect. It is usually about 0.5 to about 3 mm thick. The protective member need not have a uniform thickness over its entirety. The rim 41, covering portion 42, lug 43 and partition 44 may have different thicknesses as desired.

In the embodiments of FIGS. 2 and 8 wherein the rim 41 protrudes beyond the rear surface of the glass substrate, the protruding distance is usually about 0.01 to about 0.5 mm though not limited thereto.

Since the lug 43 is on the rear side of the glass substrate on which writing and reading light is incident, the size of the lug 43 is determined so as not to affect the writing and reading operation. Usually the lug 43 covers the glass substrate over a radial width of about 0.1 to about 2 mm from its periphery.

The protective member is generally a one-piece structure formed by integral molding. The glass substrate is received or fitted in the protective member to assemble an optical disc. Where the one-piece protective member 4 has the lug 43, the glass substrate can be fitted in the protective member by utilizing the flexibility thereof. If desired, the protective member may be constructed as a two-piece structure by dividing the rim at its root or tip end or near its center.

Adhesive Layer 5

The adhesive layer is preferably a pressure-sensitive adhesive sheet. The pressure-sensitive adhesive sheet usually has pressure-sensitive adhesive layers on both surfaces of a base sheet. The base sheet may be formed of various expanded and unexpanded plastic materials such as polyethylene terephthalate and polyethylene and has a gage of less than about 500 $\mu$m. The pressure-sensitive adhesive layer is abut 10 to 200 $\mu$m thick. A sheet formed by sheeting a pressure-sensitive adhesive alone is also useful.

Alternatively, the adhesive layer may be a coating of various conventional adhesives, for example, hot melt adhesives, thermosetting adhesives, and anaerobic adhesives. An adhesive having rubbery elasticity is preferably used so that the adhesive layer may also damp the shocks conducted to the glass substrate. The adhesive coating is preferably about 10 to 100 $\mu$m thick.

It is noted that the adhesive layer is also effective for providing a transition in thermal expansion between the glass substrate and the protective member.

EXAMPLE

Examples of the present invention are give below by way of illustration and not by way of limitation.

Example 1

A magneto-optical disc sample of the structure shown in FIG. 1(*b*) was fabricated by furnishing a glass substrate 2 of chemically strengthened glass having an outer diameter of 200 mm and a gage of 1.2 mm. A layer of UV-cured acrylic resin, an intermediate layer of SiNx, a recording layer of TbFeCo, a protective layer of SiNx, a reflecting layer of aluminum, and a protective coat of UV-cured acrylic resin were successively formed on the glass substrate 2 to provide an information-carrying means 3. The information-carrying means 3 was bonded to the covering portion 42 of a protective member 4 with a pressure-sensitive adhesive sheet 5. The space between the protective member rim 41 and the outer side of the glass substrate 2 was sealed with a resin sealant 6 which was a UV-curable acrylic resin (Chemiseal 413C commercially available from Chemitech K.K.), completing a magneto-optical disc sample No. 1. The protective member 4 was formed of a polycarbonate. The rim 41 had a radial thickness of 1.0 mm and an inner diameter of 200.5 mm. The covering portion 42 had a thickness of 1.2 mm. After the protective member 4 was joined to the glass substrate 2, the free (lower) end of the rim 41 was substantially flush with the rear surface of the glass substrate 2.

Figure 5:
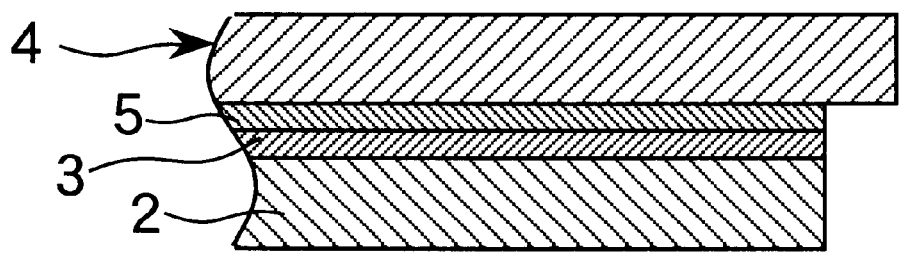
FIG. 5 is a cross-sectional view of a corner portion of a prior art optical disc.
Figure 6:
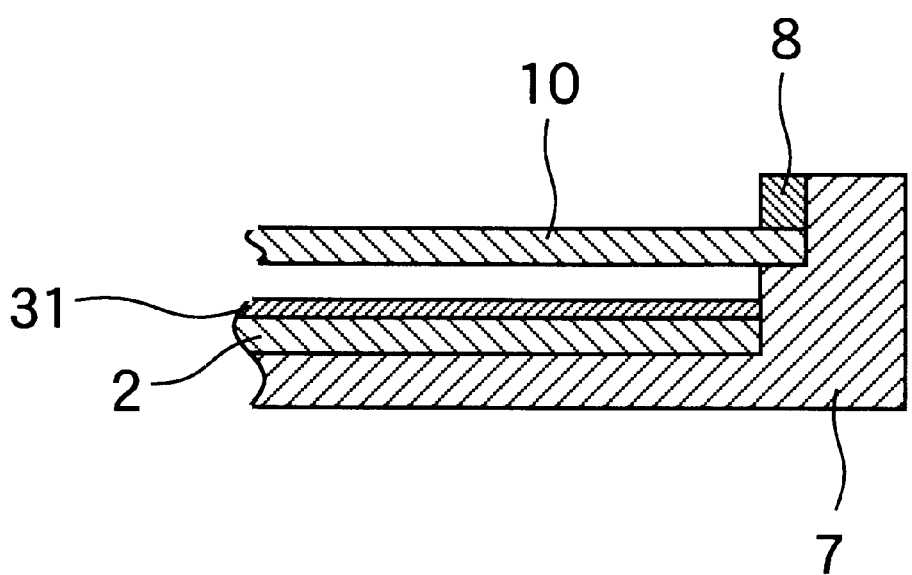
FIG. 6 is a cross-sectional view of a corner portion of another prior art optical disc.

For comparison purposes, a magneto-optical disc sample No. 101 of the structure shown in FIG. 5 was also fabricated as the recording medium disclosed in JP-A 203409/1994. The protective member 4 used was a flat polycarbonate plate having a diameter of 203 mm and a gage of 1.2 mm. The remaining components are the same as in the inventive sample.

These samples were allowed to fall under gravity on a plastic tile cemented to a concrete floor from a height of 1 m. The samples were released with the glass substrate surface oriented perpendicular to the plastic tile floor. In inventive sample No. 1, none of ten specimens on test failed. In comparative sample No. 101, three of ten specimens on test cracked and chipped along the outer corner.

Example 2

A magneto-optical disc sample No. 2 of the structure shown in FIG. 4 was fabricated. A radial distance a of 0.4 mm was defined between the rim 41 and the glass substrate 2. The space between the protective member rim 41 and the outer side of the glass substrate 2 was not sealed with a resin sealant 6. An additional space was defined between the covering portion 42 and the glass substrate 2 over a radial width b of 2.8 mm from the periphery of the glass substrate 2 and at a spacing c of 0.25 mm between the covering portion 42 and the glass substrate 2. The remaining components are the same as in sample No. 1.

A comparative sample No. 102 was fabricated by the same procedure as sample No. 2 except that the glass substrate 2 was in close fit with both the rim 41 and the covering portion 42.

Similarly these samples, Nos. 2 and 102, were allowed to fall under gravity on the plastic tile floor from a height of 1.5 m. In inventive sample No. 2, none of ten specimens on test failed. In comparative sample No. 102, four of ten specimens on test cracked and chipped along the outer corner.

The advantages of the invention are evident from the results of these examples.

Japanese Patent Application No. 259174/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical disk, comprising:

a disc-shaped glass substrate defining a pair of major surfaces and an outer side having information-carrying means on one major surface, a resin protective member including a disc-shaped covering portion and an annular rim extending from the periphery of the covering portion, an adhesive layer integrally joining said substrate and said protective member, the information-carrying means of said glass substrate faces the covering portion of said protective member and the outer side of said glass substrate is surrounded by the annular rim to leave a space between the outer side of said glass substrate and an inner surface of the annular rim, and the space between the outer side of said glass substrate and the inner surface of the protective member rim is filled with a resin.

2. The optical disc of claim 1 wherein another space is left between the one major surface of said glass substrate near the periphery thereof and the covering portion of said protective member.

3. The optical disc of claim 1 wherein the distance from the covering portion to "a" free end of the annular rim is equal to or greater than the distance from the covering portion to the other major surface of said glass substrate.

4. The optical disc of claim 1 wherein said protective member further includes an annular lug extending inwardly from a free end of the annular rim, the lug covering the other major surface of said glass substrate near the periphery thereof.

5. An optical disk, comprising:

a pair of disc-shaped glass substrates each defining a pair of major surfaces and an outer side and having information-carrying means on one major surface, a resin protective member including a disc-shaped partition portion and an annular rim extending from the periphery of the partition portion in opposite directions, an adhesive layer integrally joining said substrate and said protective member, the partition portion of said protective member intervenes between said glass substrates with each information-carrying means disposed inside and the outer side of each said glass substrate is surrounded by the annular rim to leave a space between the outer side of said glass substrate and the inner surface of the annular rim, and the space between the outer side of said a glass substrate and the inner surface of the protective member rim is filled with a resin.

6. The optical disc of claim 5 wherein the distance from the partition portion to a free end of the protective member rim is greater than the distance from the partition portion to the other major surface of each said glass substrate.

7. The optical disc of claim 5, wherein said protective member further includes a pair of annular lugs extending inwardly from the free end of the annular rim, the lug covering the other major surface of said glass substrate near the periphery thereof.

* * * * *